United States Patent [19]

Sakai

[11] Patent Number: 4,918,128

[45] Date of Patent: Apr. 17, 1990

[54] PRESSURE-SENSITIVE ADHESIVE

[75] Inventor: Tsutomu Sakai, Hachioji, Japan

[73] Assignee: Toppan Moore Co., Ltd., Tokyo, Japan

[21] Appl. No.: 290,237

[22] Filed: Dec. 22, 1988

[30] Foreign Application Priority Data

Dec. 25, 1987 [JP] Japan ................... 62-328969

[51] Int. Cl.$^4$ ............... C08F 253/00; C08L 7/02
[52] U.S. Cl. ................ 524/450; 524/458; 524/504; 524/533; 525/310
[58] Field of Search ............ 524/533, 458, 450

[56] References Cited

U.S. PATENT DOCUMENTS 2,780,605  2/1957  Bevilacqua ............... 524/458
3,981,958  9/1976  Nakashima ............... 525/310

OTHER PUBLICATIONS

Ishikawa, "Polymerizations of Methylmethacrylate and Styrene Initiated with Natural Rubber Latax", Kobunshi Rondunshu, vol. 31 (No. 12) 1974, pp. 733-7.

Primary Examiner—C. Warren Ivy
Attorney, Agent, or Firm—Wyatt, Gerber, Burke and Badie

[57] ABSTRACT

The pressure-sensitive adhesive of the invention comprises a latex of natural rubber graft-copolymerized with 2 to 10% by weight of styrene and 10 to 25% by weight of methyl methacrylate and a finely divided particulate material having no thermoplasticity such as silica gels and zeolites in an amount of 5 to 30 parts by weight per 100 parts by weight of the natural rubber. The pressure-sensitive adhesive has excellent characteristics in the adhesive bonding, resistance against blocking, frictional behavior, heat resistance and abrasion resistance and also is free from the trouble of decrease in the adhesive bonding strength caused by the transfer of a silicone oil from the roller of printing machines.

5 Claims, No Drawings

PRESSURE-SENSITIVE ADHESIVE

BACKGROUND OF THE INVENTION

The present invention relates to a pressure-sensitive adhesive or, more particularly, to a pressure-sensitive adhesive suitable for coating, for example, slips of paper so as to facilitate sealing with or binding of the slips by pressing.

It is a trend in recent years that the use of non-impact printers such as xerographic machines and the like is increasing more and more for printing paper slips to record information in offices. In some of the non-impact printers, a toner is used for forming a printed image by fixing the printed image of toner with heating. When a printing sheet of paper used in such a non-impact printer is provided in advance with a coating layer of a pressure-sensitive adhesive on certain areas with an object to facilitate sealing or binding the printed sheet, a trouble is sometimes encountered in printing that the pressure-sensitive adhesive is softened in the process of fixing of the toner-former printed image with heating so that parts of the printer are stained by the softened pressure-sensitive adhesive leading to a damage to the printer machine.

Besides, in a printer in which the fixing roller is coated with a silicone oil, a trouble is caused by the transfer of the silicone oil to the surface of the pressure-sensitive adhesive layer leading to a decrease in the adhesive bonding strength of the pressure-sensitive adhesive on the printing paper.

When an adhesive-coated paper sheets are stacked one on the other or a continuous-length sheet of paper coated with a pressure-sensitive adhesive is zigzag folded to facilitate storage or transportation, the adhesive-coated surfaces of the sheet or sheets sometimes causes a phenomenon of blocking to greatly disturb smooth feeding of the printing sheet or sheets to the printer.

The above mentioned problems are almost unavoidable in any types of pressure-sensitive adhesives including those based on natural rubber having good thermal stability and relatively free from the danger of adhering to the surface of the rollers and the like built in the printer even when it is somewhat softened by the heat of fixing.

SUMMARY OF THE INVENTION

The present invention accordingly has an object to provide a novel and improved prressure-sensitive adhesive free from the above described problems and disadvantages in the prior art adhesives. Namely, the object of the invention is to provide a pressure-sensitive adhesive which is free from the problems that paper sheets coated with the adhesive are prevented from the phenomenon of blocking when they are stacked one on the other under pressure and printers using such paper sheets for printing are free from the trouble of stain by the softened adhesive. Furthermore, a printing sheet of paper coated with the pressure-sensitive adhesive can be used without troubles even in a printer in which the fixing roller is coated with a silicone oil.

Thus, the pressure-sensitive adhesive of the present invention comprises, in admixture:

(a) a latex of natural rubber graft-copolymerized with styrene and methyl methacrylate; and (b) a finely divided particulate material having no thermoplasticity dispersed in the latex.

DETAILED DESCRIPTION OF THE PREFERRED EMBODIMENTS

As is described above, the polymeric constituent of the inventive pressure-sensitive adhesive is natural rubber graft-copolymerized with styrene and methyl methacrylate in the form of a latex. The amounts of the styrene and methyl methacrylate with which the natural rubber is graft-copolymerized are preferably in the ranges of 2 to 10 parts by weight and 10 to 25 parts by weight per 100 parts by weight of the natural rubber contained in the latex.

Another essential ingredient in the inventive pressure-sensitive adhesive is a finely divided hard particulate material having no thermoplasticity. This finely divided particulate material is dispersed in the above mentioned rubber latex as uniformly as possible. Examples of the finely divided particulate material include powdery silica gels and zeolites having a particle diameter in the range, for example, from 1 to 20 $\mu$m. The amount of the finely divided hard particulate material in the inventive pressure-sensitive adhesive is preferably in the range from 5 to 30 parts by weight per 100 parts by weight of the natural rubber in the latex. Addition of this ingredient to the pressure-sensitive adhesive has an effect to produce microscopic irregularities on the surface of the adhesive layer and also to further enhance the heat- and abrasion-resistance as well as insusceptibility to blocking of the pressure-sensitive adhesive.

In the following, the pressure-sensitive adhesive of the present invention is described in more detail by way of examples.

EXAMPLE 1

A modified natural rubber latex obtained by the graft-copolymerization of 2 parts by weight of styrene and 10 parts by weight of methyl methacrylate on to 100 parts by weight of natural rubber in a latex was admixed with 10 parts by weight of a powder of silica gel having an average particle diameter of about 10 $\mu$m, 5 parts by weight of a wax emulsion as a lubricant and 5 parts by weight of a terpene resin as a tackifier to prepare a pressure-sensitive adhesive, which is referred to as the adhesive I hereinbelow.

EXAMPLE 2

A pressure-sensitive adhesive, referred to as the adhesive II hereinbelow, was prepared in substantially the same formulation as in the preparation of the adhesive I excepting increase in the amounts of the styrene and methyl methacrylate from 2 parts by weight to 8 parts by weight and from 10 parts by weight to 25 parts by weight, respectively.

EXAMPLE 3

A pressure-sensitive adhesive, referred to as the adhesive III hereinbelow, was prepared in substantially the same formulation as in the preparation of the adhesive I described above excepting replacement of 10 parts by weight of the silica gel powder having an average particle diameter of 10 $\mu$m with 20 parts by weight of another silica gel powder having an average particle diameter of about 4 $\mu$m.

EXAMPLE 4

A pressure-sensitive adhesive, referred to as the adhesive IV hereinbelow, was prepared in substantially the same manner as in the preparation of the adhesive I excepting an increase of the amount of styrene from 2 parts by weight to 4 parts by weight and replacement of 10 parts by weight of the silica gel powder having an average particle diameter of 10 μm with 30 parts by weight of the same silica gel powder as used in the preparation of the adhesive III.

EXAMPLE 5

A pressure-sensitive adhesive, referred to as the adhesive V hereinbelow, was prepared in substantially the same manner as in the preparation of the adhesive I excepting addition of 15 parts by weight of a zeolite having an average particle diameter of about 8 μm in place of the silica gel powder.

COMPARATIVE EXAMPLE 1

A pressure-sensitive adhesive, referred to as the adhesive VI hereinbelow, was prepared by compounding natural rubber, a wax emulsion as a lubricant and a terpene resin as a tackifier in a weight ratio of 65:20:15.

COMPARATIVE EXAMPLE 2

A pressure-sensitive adhesive, referred to as the adhesive VII hereinbelow, was prepared in substantially the same formulation as in the preparation of the adhesive I except that the modified natural rubber latex was prepared by the graft copolymerization of 15 parts by weight of methyl methacrylate alone per 100 parts by weight of natural rubber with omission of styrene as the grafting monomer.

COMPARATIVE EXAMPLE 3

A pressure-sensitive adhesive, referred to as the adhesive VIII hereinbelow, was prepared by compounding the adhesive composition prepared in Comparative Example 2 with 20 parts by weight of a silica gel powder having an average particle diameter of about 6 μm.

EVALUATION OF THE PRESSURE-SENSITIVE ADHESIVES

Each of the adhesives I to VIII prepared in the above described Examples and Comparative Examples was applied to a sheet of wood-free paper having a basis weight of 70 g/m² by using a wire-bar coater in a coating amount of 5 g/m² as dried followed by drying at 100° C. for 1 minute to give a test sample. The thus prepared test samples were subjected to te evaluation tests for the items and testing methods described below to give the results shown in the table in four ratings of A: excellent; B: good; C: fair; and D: poor.

ADHESIVE BONDING 1

The test sample was heated at 180° C. for 2 seconds and then coated with a silicone oil in a coating amount of 0.2 to 0.4 g/m² by using a RI tester followed by press-bonding under a pressure of 120 kg/cm² using a sealing machine.

Adhesive bonding 2

The testing conditions were the same as in adhesive bonding 1 excepting omission of coating with the silicone oil.

ANTI-BLOCKING TEST

The test sample was kept standing for 1 hour at a temperature of 20° C. to 150° C. under a pressure of 500 g/cm² followed by the measurement of the peeling resistance using a tensile tester.

FRICTIONAL BEHAVIOR

The coefficient of static friction of the test sample was measured by using a friction-angle tester against a sheet of wood-free paper and a sheet of stainless steel.

HEAT RESISTANCE

The surface of the test sample was rolled with a metal-made roller kept at 200° C. under a load of 1 to 3 kg/cm² and the condition of the surface was visually examined.

ABRASION RESISTANCE

The surface of the adhesive-coated test sample was rubbed with a metal piece under a load of 200 to 500 g/cm².

| Adhesive | Adhesive bonding 1 | Adhesive bonding 2 | Anti-blocking | Frictional behavior | Heat resistance | Abrasion resistance |
|---|---|---|---|---|---|---|
| I | B | A | A | A | A | B |
| II | B | A | B | A | A | A |
| III | A | A | B | B | B | A |
| IV | B | A | A | A | A | A |
| V | B | A | A | A | A | A |
| VI | D | D | C | D | D | D |
| VII | D | D | A | B | C | C |
| VIII | D | D | A | B | C | C |

As is understood from the above summarized results of testing, the pressure-sensitive adhesive of the present invention has excellent characteristics in the adhesive bonding, resistance against blocking, frictional behavior, heat resistance and abrasion resistance so that adhesive-coated sheets with the inventive pressure-sensitive adhesive are free from the trouble of blocking in storage and transportation even in a pressed condition without loss of adhesive bonding strength. Moreover, printing sheets coated with the inventive pressure-sensitive adhesive can be printed smoothly on a non-impact printing machine without the troubles of contamination of the machine parts or decrease in the adhesive bonding strength due to transfer of the silicone oil from the roller surface to the adhesive layer.

What is claimed is:

1. A pressure-sensitive adhesive which comprises in admixture:
    (a) natural rubber graft copolymerized with styrene and methyl methacrylate in the form of a latex; and
    (b) a finely divided hard particulate matter having no thermoplasticity dispersed in the latex.

2. The pressure-sensitive adhesive as claimed in claim 1 wherein the amounts of styrene and methyl methacrylate with which the natural rubber is graft-copolymerized are in the ranges from 2 to 10 parts by weight and from 10 to 25 parts by weight, respectively, per 100 parts by weight of the natural rubber.

3. The pressure-sensitive adhesive as claimed in claim 1 wherein the finely divided particulate material having no thermoplasticity is a silica gel powder or a zeolite powder.

4. The pressure-sensitive adhesive as claimed in claim 1 wherein the amount of the finely divided particulate material having no thermoplasticity is in the range from 5 to 30 parts by weight per 100 parts by weight of the natural rubber.

5. The pressure-sensitive adhesive as claimed in claim 1 wherein the finely divided particulate material having no thermoplasticity has an average particle diameter in the range from 1 μm to 20 μm.

* * * * *